US008523373B2

(12) United States Patent
Li et al.

(10) Patent No.: US 8,523,373 B2
(45) Date of Patent: Sep. 3, 2013

(54) SHELL AND DISPLAY MODULE OF MOBILE COMMUNICATION TERMINAL AND A METHOD OF FORMING THE SAME

(75) Inventors: Huating Li, Shenzhen (CN); Mintao Chen, Shenzhen (CN); Lei Zhong, Shenzhen (CN); Jiaxin Zhang, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 232 days.

(21) Appl. No.: 13/060,870

(22) PCT Filed: Sep. 7, 2009

(86) PCT No.: PCT/CN2009/073791
§ 371 (c)(1),
(2), (4) Date: Feb. 25, 2011

(87) PCT Pub. No.: WO2010/025690
PCT Pub. Date: Mar. 11, 2010

(65) Prior Publication Data
US 2011/0157866 A1   Jun. 30, 2011

(30) Foreign Application Priority Data
Sep. 8, 2008   (CN) .......................... 2008 1 0222072

(51) Int. Cl.
*G09F 13/12* (2006.01)
*G09F 13/14* (2006.01)

(52) U.S. Cl.
USPC .............................. 362/84; 362/560; 362/300

(58) Field of Classification Search
USPC .................... 362/84, 559–561, 296.01–296.1
See application file for complete search history.

(56) References Cited

U.S. PATENT DOCUMENTS

2003/0189557 A1* 10/2003 Takagi et al. ................. 345/204
2004/0110540 A1*  6/2004 Sato et al. ..................... 455/566
2004/0203495 A1* 10/2004 Cheng et al. ................. 455/90.1

FOREIGN PATENT DOCUMENTS

| CN | 1432460 | 7/2003 |
| CN | 1486057 | 3/2004 |
| CN | 201039242 Y | 3/2008 |
| EP | 1353311 | 10/2003 |
| JP | 2002-229007 | 8/2002 |
| WO | WO 2004/091347 | 10/2004 |
| WO | WO 2006/112707 | 10/2006 |

OTHER PUBLICATIONS

International Search Report mailed Dec. 10, 2009, for PCT Patent Application No. PCT/CN2009/073791.

(Continued)

*Primary Examiner* — Karabi Guharay
*Assistant Examiner* — Nathaniel Lee
(74) *Attorney, Agent, or Firm* — Finnegan, Henderson, Farabow, Garrett & Dunner, LLP

(57) ABSTRACT

A shell of mobile communication terminal is provided. The shell includes a shell body made by a transparent or semi-transparent material and having an outer surface and an inner surface. The inner surface has patterns formed thereon. A semitransparent-semireflecting layer is formed on the outer surface of the shell body. The patterns can be observed from outside of the shell body when there is light transmitting from the inner surface to the outer surface, and the semitransparent-semireflecting layer presents a mirror effect when there is no light transmitting from the inner surface to the outer surface.

19 Claims, 4 Drawing Sheets

(56) References Cited

OTHER PUBLICATIONS

Written Opinion mailed Dec. 10, 2009, for PCT Patent Application No. PCT/CN2009/073791.

Extended European Search Report mailed Mar. 8, 2012, for European Patent Application No. 09811065.3.

* cited by examiner

SHELL AND DISPLAY MODULE OF MOBILE COMMUNICATION TERMINAL AND A METHOD OF FORMING THE SAME

The present application is a national phase entry of PCT application No. PCT/CN2009/073791, filed Sep. 7, 2009, designating the United States of America, which claims priority to, and benefit of Chinese patent application No. 200810222072.5, filed on Sep. 8, 2008, the entirety of which is hereby incorporated by reference.

FIELD OF THE DISCLOSURE

The present disclosure generally relates to an improved structure of a communication terminal and a method of forming the same, especially relates to a shell and a display module of mobile communication terminals and a method of forming the same.

BACKGROUND

As the development of the mobile communication technique, the appearance and the colorful and brilliant visual experience of the mobile communication terminals, such as mobile telephone, receive extensive concern, become more and more important. There are two common techniques for decorating the surface of a mobile telephone shell at present, which include printing and IML (in-mold label). The IML is a technique for forming a sclerous transparent film on the outer surface, a printing pattern layer in the middle, and a plastic layer at the back. But the IML technique needs high level of the mold structure design and has lower yield of product. So this technique is difficult to be widespread in mass production of mobile communication terminals.

Besides there is a disadvantage of the shell formed by traditional techniques above, i.e. it is difficult to realize colorful and brilliant visual effects and more eye-catching changeable optical effects. Additionally, after the printing pattern in the middle of the shell is printed, it can not be changed, so that interesting to consumer may be lost gradually.

At the present time, the mobile telephones having mirror and luminous effects appear in the market (such as described in CN1432460A, published on Jul. 30, 2003), but the function of the shell of said mobile telephone is still simple, their visual effect is single and does not have florid optical effects.

SUMMARY OF THE DISCLOSURE

In one aspect, the present invention provides a shell of mobile communication terminals, which comprises an shell body made by transparent or translucent materials and a semitransparent-semireflecting layer, wherein, the shell body has an outer surface and an inner surface, and there are patterns on the inner surface; said semitransparent-semireflecting layer is formed on the outer surface of the shell, so that the patterns can be observed from the outer surface of the shell body when there is light transmitting from the inner surface to the outer surface, and the semitransparent-semireflecting layer appears mirror when there is no light transmitting from the inner surface to the outer surface.

In another aspect of the present invention, the transmittance of the semitransparent-semireflecting is about 5%-25%.

In yet another aspect of the present invention, a display module of mobile communication terminals comprises a shell said above, a localizing frame connected with said shell, a luminescence unit located between said shell and localizing frame and a liquid crystal display (LCD) unit.

In yet another aspect of the present invention, a method of forming said shell of mobile communication terminals comprises: forming an shell body having outer surface and inner surface with transparent or translucent materials, forming patterns on the inner surface of said shell body, forming a semitransparent-semireflecting layer on the outer surface of said shell body.

In yet another aspect of the present invention again, a method of forming said display module of mobile communication terminals comprises: forming an shell body as said above, forming a localizing frame, forming luminescence unit, positioning said luminescence unit in said localizing frame, and connecting said shell body with localizing frame, wherein, said luminescence unit can select the light transmitting said shell body, and said luminescent unit is posited between the inner surface and said localizing frame in order that the emitting-light from said luminescent unit can transmit said shell body from the inner surface to the outer surface.

DETAILED DESCRIPTION OF THE DISCLOSURE

According to one embodiment of the present disclosure, a shell of mobile communication terminals is provided referring to the figures.

According to another embodiment of the present disclosure, a display module of mobile communication terminals is provided referring to the figures.

According to another embodiment of the present disclosure, forming methods of said shell and display module are provided referring to the figures.

In the illustration hereinafter, mobile telephone is set an example of mobile communication terminals to describe the embodiments of the present disclosure in detail. However, the present disclosure is not limited to this, mobile communication terminals can be pager, intelligent terminal, personal digital assistant (PDA) and so on.

Figure 1:
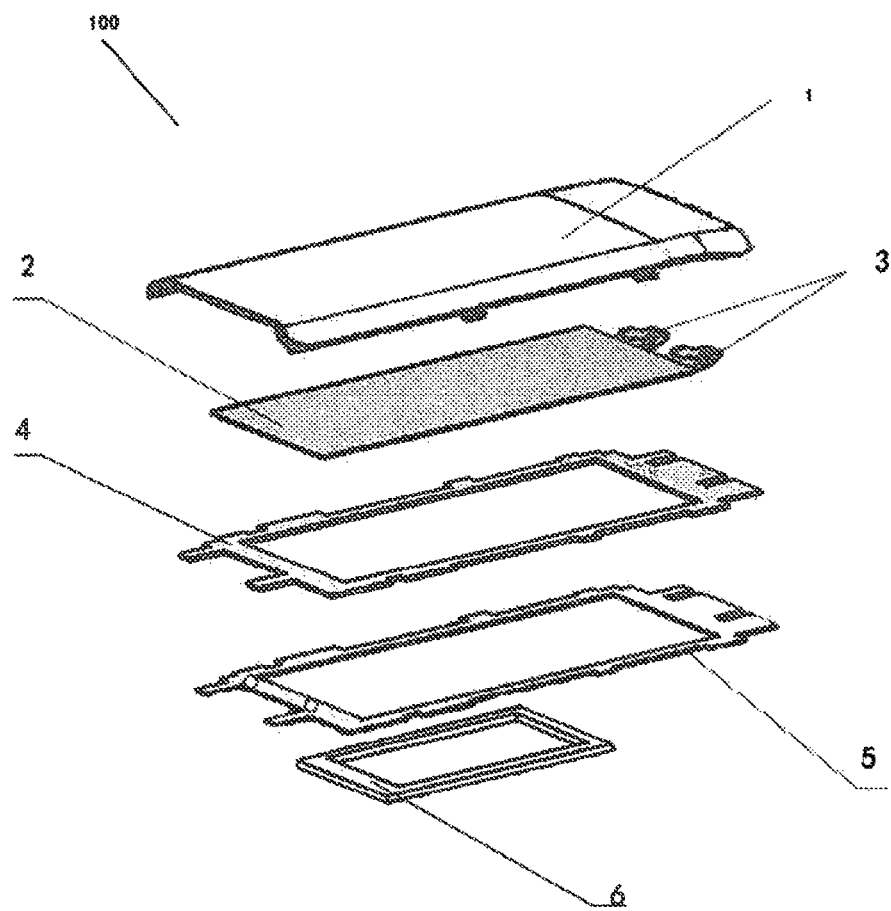
FIG. 1 is a disassembled perspective schematic diagram of a display module used in mobile telephone according to an embodiment of the present disclosure.

In FIG. 1, a disassembled stereo schematic diagram of display module 100 is shown. The parts of said display module 100 comprise: shell 1, adhesive sheet 4, localizing frame 5, light guide plate 2, two LED 3 and liquid crystal display (LCD) unit 6, wherein, both LED 3 are beside light guide plate 2, the LED 3 and the light guide plate 2 are posited between said localizing frame 5 and said shell 1. Said display module 100 can be used as display unit of monoboard mobile telephone and foldable mobile telephone in order to provide various visual effects.

Figure 2:
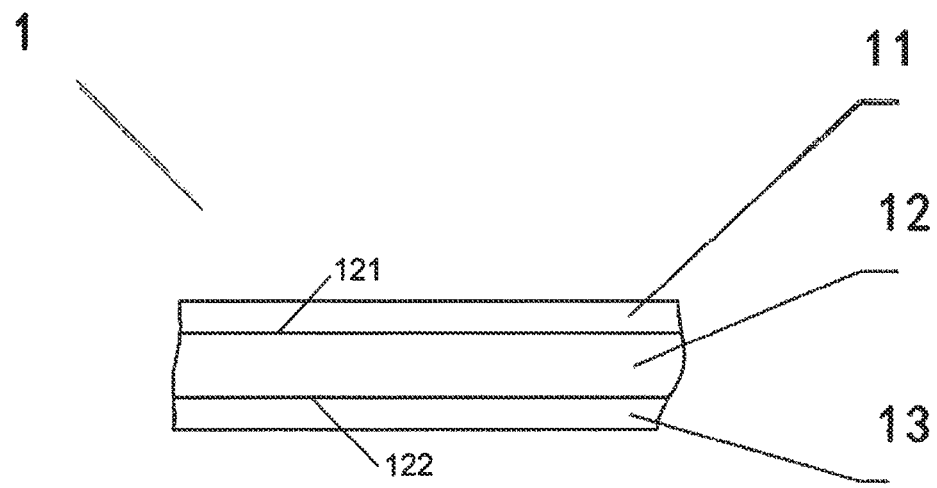
FIG. 2 is a cross section viewgraph of a shell of mobile telephone according to an embodiment of the present disclosure.

The detailed structure of display module 100 of a mobile telephone is illustrated hereinafter referring to FIG. 2 to FIG. 6. As shown in FIG. 1, shell 1 of said display module provides design for the mobile telephone since the shell having various visual effects and mirror result are need in the present disclosure. FIG. 2 shows a mobile telephone shell 1, which comprises: shell body 12 made by transparent or translucence materials and semitransparent-semireflecting layer 11 formed on said outer surface 121, wherein, said shell body 12 has an outer surface 121 and an inner surface 122, there are patterns 13 on said inner surface 122; said semitransparent-semireflecting layer 11 is used to reach a result like this: the patterns 13 can be observed from the outside of said shell body 12 when there is light transmitting from said inner surface 122 to said outer surface 121, and the perspective effect of patterns 13 can change along with the change of light; said semitransparent-semireflecting layer 11 appears mirror when there is no light transmitting from said inner surface 122 to said outer surface 121. The term "semitransparent-semireflecting" denotes that said layer 11 has the performance that can not only transmit a part of light ray but also can reflect a part of light ray, it can not be understood that the layer 11 can transmit half light ray and reflect half light ray.

According to one embodiment of the present disclosure, said shell body 12 can be formed by all kinds of proper plastic usually used in this field, such as one or more plastic selected from polycarbonate whose weight average molecular weight is about 20000-60000, acrylonitrile-butadiene-styrene copolymer whose weight average molecular weight is about 20000-150000, and polycarbonate alloy, preferably, said polycarbonate whose weight average molecular weight is about 20000-60000 is better. The materials said above can be obtained from market easily. Additionally, said shell body 1 can also be prepared by other transparent or translucence materials, such as toughened glass and so on, the examples are just used to illustrate the purpose of the present disclosure but not to limit the protective scope of the present disclosure, the materials that can form transparent or translucence shell body are available.

Said semitransparent-semireflecting layer 11 can be formed on the outer surface 121 of the shell 1 by physical vapour deposition or providing a semitransparent-semireflecting film on the outer surface 121, if only the patterns formed on the inner surface can be observed when there is light transmitting from the inner surface to the outer surface, and the visual effects can change along with the change of the light. According to one embodiment of the present disclosure, said semitransparent-semireflecting layer 11 comprises: a prime coat on said outer surface 121; an electroplated layer coated with predetermined amount of target material on said prime coat; an varnish stain layer with predetermined thickness coated on said electroplated layer and a topcoat with predetermined thickness coated on said varnish stain layer.

The patterns 13 can be formed on the inner surface 122 of said shell body 12 according to needs of the design and market. Said patterns 13 can have planar effect and relief effect, and different visual effect can appear thanks to the different primary color such as one or more color selected from blue, green and red and so on. According to one embodiment of the present disclosure, said patterns 13 can be formed on said inner surface 122 by thermal transfer printing. According to another embodiment of the present, the same result can be obtain by carving needed patterns on the inner surface 122 of said shell body 12.

The detailed method of forming the mobile telephone shell according to the embodiments of the present disclosure will be illustrated hereinafter. Said method of forming the shell 1 according to the embodiments of the present disclosure comprises the steps as follows: first, an shell body 12 with an outer surface 121 and an inner surface 122 is prepared by transparent or semitransparent materials; then, patterns 13 is formed on the inner surface 121 of said shell body 12; finally, an semitransparent-semireflecting layer 11 is formed on the outer surface 121 of said shell body 12, wherein, the patterns 13 can be observed from the outside of said shell body 12 when there is light transmitting from said inner surface 122 to said outer surface 121; said semitransparent-semireflecting layer 11 appears mirror when there is no light transmitting from said inner surface 122 to said outer surface 121.

In the method for forming said shell 1, physical vapor deposition and thermal transfer printing are used, which will be introduced hereinafter.

Usually, physical vapor deposition is used for forming mirror on the surface of objects in this field. In the physical vapor deposition, metal particles are produced by vaporizing, ionizing, sputtering and other processes, the metal particles react with reactive gases to form compound depositing on the surface of workpiece. At present, there are there types of physical vapor deposition, vacuum evaporation, vacuum sputtering and vacuum ionizing. Correspondingly, the vacuum film coating equipments include vacuum evaporation film coating equipment, vacuum sputtering film coating equipment, vacuum ion film coating equipment and so on.

Vacuum ion type and vacuum ion film coating equipment are usually used in the field at present. In the vacuum ion type, the coating materials (such as Sn, Ti and so on) suffer gasifying-vaporizing-ionizing processes by means of inert gas glow discharge, the ions are accelerated by electric field and bombard the surface of workpiece with higher energy, the reactive gases such as $CO_2$, $N_2$ and so on are added at the same time, then the corresponding metal-gas compound coating is obtained on the surface of the workpiece. The deposition temperature of the vacuum ion film coating is about 500° C., the adhesion of the coating is strong, so the vacuum ion film coating is used in many industrial film coating situations.

Thermal transfer printing is a special printing for forming patterns, and patterns can be transferred on to surface of objects by this technology. To be specific, said thermal transfer printing comprises the steps as follows: first, the patterns are preprinted on the transfer carrier; then, the carrier suffers heat and pressure by thermal transfer equipment in order to transfer said patterns to the surface of the products, and the ink layer and the surface of the products combine with each other adequately after molding. The patterns printed by this method are lifelike and durable. Thermal transfer printing technology includes transfer film printing and transfer processing, wherein, in transfer film printing, the patterns are printed on the surface of the film by dot-printing, said patterns can reach the requirements of the designers and the technology can be used for mass production; in transfer processing, the patterns can be transfer printed on the surface of the products directly by thermal transfer equipment, the ink layer and the surface of the products combine with each other adequately after molding, and the patterns are lifelike, then the products grade is heightened.

Thermal transfer printing is used widely, its main advantages comprise: the patterns are exquisite; the process can be finished by common heat printing machine or thermal transfer printing machine; the patterns can be molded directly; it is simple to handle; low cost, small loss of products, high added value, good technology decorative, high covering power and strong adhesion; meeting the standard of green environmental protection. According to the embodiments of the present disclosure, physical vapor deposition combined with thermal transfer printing is used to prepare said mobile telephone shell 1.

EXAMPLES

Forming the mobile telephone shell 1.

Example 1

(1) First, said shell body 12 was made with transparent or semitransparent materials by injection or molding, said materials can be one or more selected from polycarbonate whose weight average molecular weight is about 20,000-100,000, polymethyl methacrylate (PMMA) whose weight average molecular weight is about 25,000-200,000, silicone (RUBBER) whose weight average molecular weight is about 120,000-200,000, polyethylene terephthalate (PET) whose weight average molecular weight is about 20,000-50,000; secondly, said shell body 1 was cleaned with ultrasonic in order to clean the besmirch and impurity on the outer surface 121 of said shell body 12, this process was helpful to vapor deposition; then, is said outer surface 121 was sprayed a primer layer with thickness of 10 um using spray coating; finally, said coated outer surface 121 was dried on automatic spraying line.

(2) Said shell body 12 was put into a metal vapor coating furnace for physical vapor deposition, and Sn was used as target material. The mount of Sn was 0.06 g per target, there were 32 targets used for spraying the outer surface 121 which was sprayed primer layer. The mount of Sn was determined by the transmittance of said shell. In the present disclosure, the transmittance of said shell 1 was needed to be controlled in the scope of about 5%-25% in order that the patterns 13 can be observed through said semitransparent-semireflecting layer. According to another embodiment of the present disclosure, the amount of Sn can be regulated in order to control the transmittance of said shell 1 in the scope of about 5%-15%.

(3) After said shell was coated with metal for 4 hours, a colored paint layer with thickness of 15 μm was sprayed. Said colored paint layer was used to color the semitransparent-semireflecting layer to satisfy different appearance design. When the colored paint layer was dry, a topcoat layer with thickness of 20 μm was sprayed, and said topcoat layer was used to protect the surface of said shell from abrasion or unexpected scratch. Then, the shell 1 formed said semitransparent-semireflecting layer was dried, and the physical vapor deposition process was finished. After suffered the processes said above, the outer surface of said shell body 12 has minor result when said shell 1 was observed directly, meanwhile, a semitransparent-semireflecting effect was observed from the outer surface of said shell 1 when there was light transmitting from said inner surface 122 to said outer surface 121.

(4) Hereinafter, the method for forming patterns 13 on the inner surface 122 of said shell body 12 using thermal transfer printing was illustrated. In the thermal transfer printing process, first, a release agent layer with thickness of 10 μm was printed on a PET film with printer (such as five colors printer), the release agent was melted at high temperature and separated from the PET film. After the PET film was dried, a curing glue or UV transparent ink layer with thickness of 15 μm was printed on the PET film; then the PET film was dried and an environmentally friendly printing ink layer special for thermal transfer printing with thickness of 15 μm was printed on the PET film; after the PET film was dried again, a glue water layer with thickness of 10 μm was printed on the PET film and the PET film was dried; whereafter, the patterns on the PET film were transfer printed to the inner surface 122 of the shell body 12 coated with semitransparent-semireflecting layer 11 using thermal transfer printing machine (such as roller heating printing), wherein, the temperature of the transfer part was about 180° C., and the pressure should be about 2.5 MPa, the transfer printing time was about 2 seconds. Said shell 1 suffering transfer printing was put about 30 cm away from an about 50W ultraviolet lamp for about 1 minute. What need to be exposited was that the pressure and temperature in this process could be regulated according to the requirements of the technology for forming the shell. After the technologies said above, a shell D1 was prepared, wherein, the appearance surface of D1 had mirror effect and the inner surface of D1 had patterns 13.

Example 2

(1) According to the technology for forming mobile phone shell in the present disclosure, said shell body 12 was formed with transparent or semitransparent materials using molding, said materials can be one or more materials selected from the materials referred in example 1; said shell body 1 was cleaned with ultrasonic wave in order to clean the besmirch and impurity on the outer surface 121 of said shell body 12, this process was helpful to vapor deposition; then, said outer surface 121 was sprayed a primer layer with thickness of 30 um using spray coating; then, said coated outer surface 121 was dried on automatic spraying line.

(2) Said shell body 12 was put into a metal vapor coating furnace for physical vapor deposition, and Sn was used as target material. The mount of Sn was 0.1 g per target, there were 32 targets used for spraying the outer surface 121 which was sprayed primer layer. The amount of Sn was determined by the transmittance of said shell. In the present disclosure, the transmittance of said shell 1 was needed to be controlled in the scope of about 5%-30% in order that the patterns 13 can be observed through said semitransparent-semireflecting layer, preferably, said transmittance was about 5%-25%. According to another embodiment of the present disclosure, the amount of Sn can be controlled in order to control the transmittance of said shell 1 in the scope of about 5%-40%.

(3) After said shell was coated with metal for 4 hours, a colored paint layer with thickness of 15 μm was sprayed. Said colored paint layer was used to color the semitransparent-semireflecting layer to satisfy different appearance design. When the colored paint layer was dry, a topcoat layer with thickness of 40 μm was sprayed, and said topcoat layer was used to protect the surface of said shell from abrasion or unexpected scratch. Then, the shell 1 formed said semitransparent-semireflecting layer was dried, and the physical vapor deposition process was finished. After suffered the processes said above, the outer surface of said shell body 12 has mirror effect when said shell 1 was observed directly, meanwhile, a semitransparent-semireflecting effect was observed from the outer surface of said shell 1 when there was light transmitting from said inner surface 122 to said outer surface 121.

(4) Hereinafter, the method for forming patterns 13 on the inner surface 122 of said shell body 12 using thermal transfer printing was illustrated. In the thermal transfer printing process, first, a release agent layer with thickness of 30 μm was printed on a PET film with printer (such as five colors printer), the release agent was melted at high temperature and separated from the PET film. After the PET film was dried, a curing glue or UV transparent ink layer with thickness of 30

μm was printed on the PET film; then the PET film was dried, and optionally, an environmentally friendly printing ink layer special for thermal transfer printing with thickness of 30 μm was printed on the PET film; after the PET film was dried again, a glue water layer with thickness of 30 μm was printed on the PET film and the PET film was dried; whereafter, the patterns on the PET film were transfer printed to the inner surface 122 of the shell body 12 coated with semitransparent-semireflecting layer 11 using thermal transfer printing machine (such as roller heating printing), wherein, the temperature of the transfer part was about 195° C., and the pressure should be about 3 MPa, the transfer printing time was about 1.5 seconds. Said shell 1 suffering transfer printing was put about 30 cm away from an about 50W ultraviolet lamp for about 0.5 minute. What need to be exposited was that the pressure and temperature in this process could be regulated according to the requirements of the technology for forming the shell. After the technologies said above, a shell D2 was prepared, wherein, the appearance surface of D2 had mirror effect and the inner surface of D2 had patterns 13.

As known in this field, besides thermal transfer printing, other methods such as etching, carving, pad printing or hot stamping and so on, could be used to form patterns 13 on said inner surface 122. Thus, the method said above was used to hint but not limit the present disclosure.

Hereinafter, the forming method and the structure of the display module 100 are illustrated by referring to FIGS. 1-6 in detail.

As shown in FIG. 1, said display module comprises a localizing frame 5, a shell 1 and a luminescence unit.

Figure 3:
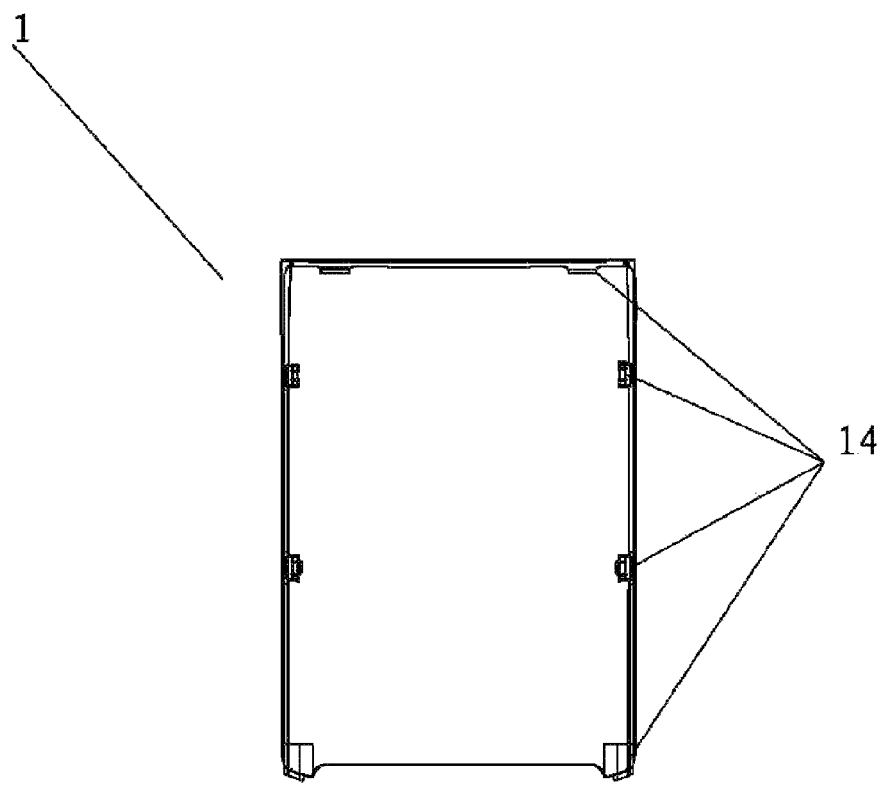
FIG. 3 is a bottom viewgraph of the shell of mobile telephone according to FIG. 2.
Figure 4:
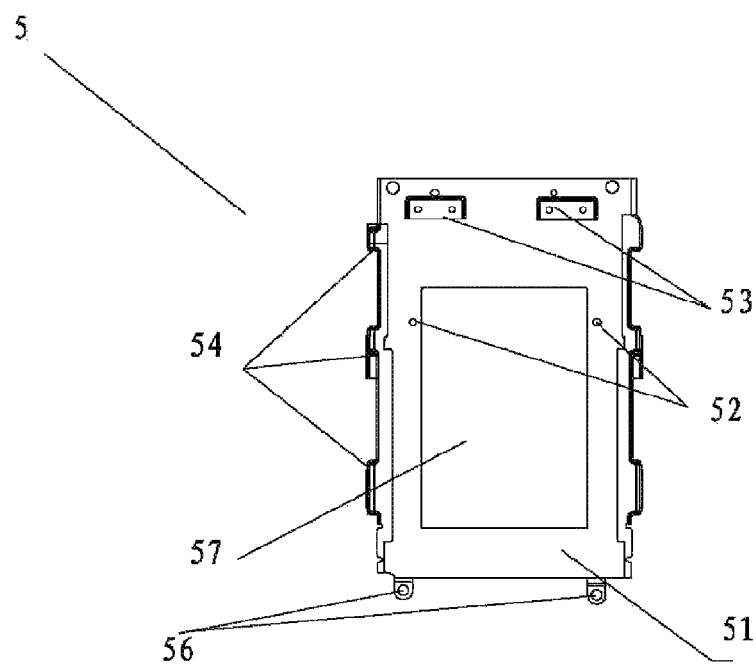
FIG. 4 is a schematic diagram of a localizing frame according to an embodiment of the present disclosure.

As shown in FIG. 4, said localizing frame 2 comprises a frame body 51, a localizing pin 52, a LED containing part 53, screw holes 55 and 56, and block button part 54 on the edge of said frame body 51. Said block button part 54 is used to joint with a block button part 14 formed on the edge of said mobile phone shell 1 in order to assemble said display module 100. There is a central open 57 in the center of the frame body 51, and the liquid crystal display unit 6 can connect with said light guide plate 2 through the central open 57. There is at lease one LED containing part 53 set on the upper end of said frame body 51. Said LED containing part 53 was used to contain illuminant LED 3. According to one embodiment of the present disclosure, there are two LED containing parts 53 set on said frame body 51. In fact, the number of the LED containing parts 53 can be set according to the requirements. The place of the LED containing part is not limited if only the LED containing part is adjacent with said light guide plate in order that the light emitted by said LED can transmit through said light guide plate. Furthermore, as shown in FIG. 3, there are screw holes 55 and 56 in said localizing frame which are used to connect the shell. In order to locate said light guide plate 2 accurately, the localizing pin 52 is set on said localizing frame 5. Said localizing pin 52 matches with the localizing holes 22 on said light guide plate 2 in order to locate the light guide plate accurately. As known in this field, in order to locate said light guide plate 2 on the localizing frame 5 accurately, the localizing pin can be set on the light guide plate 2 and the localizing holes can be set on the frame body 51. Moreover, other localizing methods can be used to locate said localizing frame and light guide plate. According to the embodiments of the present disclosure, said localizing frame can be made by any molding methods, such as punching, molding and so on.

The material of the localizing frame 5 can be selected from all kinds of metal or plastic materials which are widely known in this field, such as stainless steel, Al—Mg alloy and polycarbonate with weight average molecular weight of about 20,000-60,000 and so on.

The luminescence unit of display module comprises at least a light emitting diode (LED) 3 and a light guide plate 2, wherein, the LED 3 and light guide plate 2 are adjacent, and the light guide plate 2 is used to guide the light emitted by LED 3 to shell. Said luminescence unit is used to product light and guide the light to pass said shell 1. Obviously, said luminescence unit can also be other light sources, such as lamp, cold cathode photo-source and so on, if only they can provide optical effects.

Figure 5:
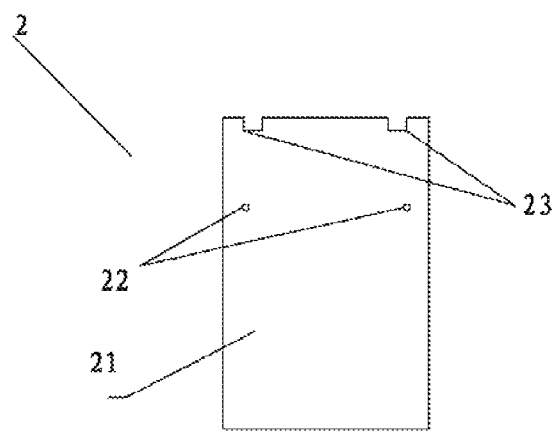
FIG. 5 is a schematic diagram of a light guide plate according to an embodiment of the present disclosure.

FIG. 5 shows a schematic diagram of the light guide plate 2 according to an embodiment of the present disclosure. The light guide plate 2 is used to uniform the light emitted by the luminescence unit in order to meet the requirements of mutative optical patterns. As shown in FIG. 5, the light guide plate 2 is a device used is for transferring linear light source to surface light source. According to an embodiment of the present disclosure, the thickness of said light guide plate 2 is between about 0.1 mm-0.5 mm. Furthermore, according to another embodiment of the present disclosure, the thickness of said light guide plate 2 can be more than about 1 mm, which is determined by specific conditions. According to an embodiment of the present disclosure, the light guide plate 2 is made by optical grade acryl, and the thickness is no less than 0.4 mm The light guide spot of the light guide plate 2 has high light ray conductivity, which can transfer the light to surface light source in order to uniform the light. The light guide plate 2 has extremely high light reflectivity and doesn't absorb light. The specific principle is as follows: the light guide spots are printed on the bottom surface of the optical grade acryl plate with UV screen printing; the optical grade acryl plate extracts the light emitted from light source, when the light reaches every light guide spot, the light will be reflected towards various angles, then the reflection conditions is broken and the light emits out from the front of the light guide plate. The size and density of the light guide spots are variable. The advantages of using light guide plate 2 are as follows: high light conversion rate, uniform light ray, long life; high luminous efficiency, low power consumption; variable shape, such as roundness, oval, triangle and so on; thinner products can be used at equal brightness in order to save cost; any light source can be used, linear light source can be transferred to surface light source, light source comprises LED, CCFL, fluorescent lamp and so on.

The material of the light guide plate 2 can be one or more material selected from the group consisting of polycarbonate whose weight average molecular weight is about 20,000-100,000, polymethyl methacrylate (PMMA) whose weight average molecular weight is about 25,000-200,000, silicone (RUBBER) whose weight average molecular weight is about 120,000-200,000, polyethylene terephthalate (PET) whose weight average molecular weight is about 20,000-50,000. Said materials can be purchased. As shown in FIG. 5, an LED position 23 is set on the top of the light guide plate 2 in order to contain LED 3. Furthermore, said light guide plate 2 can be semitransparent to prevent that the inner structure of the LCD unite when the LCD is not be lightened, the transmittance of the light guide plate 2 is about 50%-90%.

According to the embodiments of the present disclosure, the type of LED can be any type widely known in this field, such as monochrome LED, or one or more type selected from RGB three primary colors LED, the number of the LED can be about 1-12. The LED said above can be purchased. The LED referred here is just used to give a demonstration but not to limit the scope of the present disclosure.

In order to further improve the visual effect of the display module, a LED unite 6 can be set at the lower part of the light guide plate 2. The type of the LED unit can be any type widely known in this field, such as one or more type selected from the group consisting of TFT display unit, CSTN (Color STN) display unit and OLED (Organic LED), and the number of the LED unit is about 0-3, which can change according to the specific design requirements. The LED unit said above can be purchased.

Figure 6:
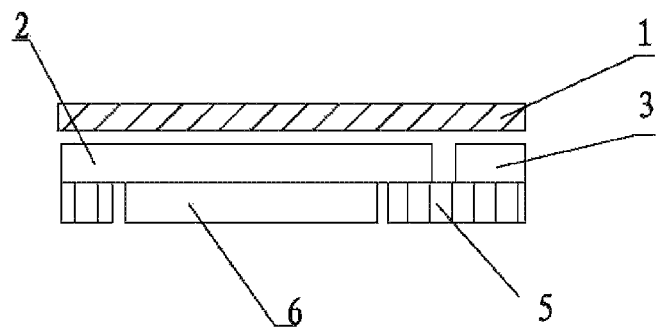
FIG. 6 is an assembly schematic diagram of a display module according to an embodiment of the present disclosure.

The LED 3 is put into the LED position 23 which is on the light guide plate 2, then the assemble is set above the LCD unite 6, all parts are assembled on the localizing frame 5 with optical adhesive, the localizing hole 22 in the light guide plate 22 is connected with the localizing pin 52 on said localizing frame 5 so that the light guide plate 2 can be localized accurately. Then, the assembled device is set under the shell 1, after the block button part 54 of the localizing frame 5 is connected with the block button part 14, the display module 100 is finished as shown in FIG. 6.

Figure 7:
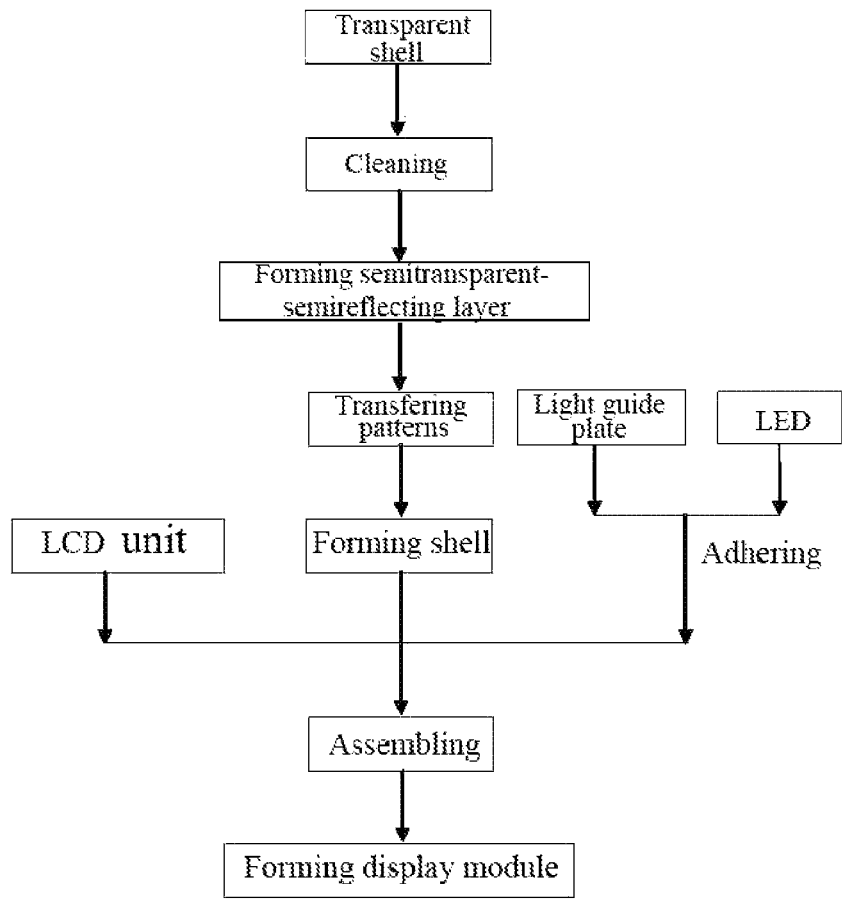
FIG. 7 is a schematic diagram of a method of forming a display module according to an embodiment of the present disclosure.

The light guide plate 2 is connected with the localizing frame 5 with the adhesive sheet 4, and said adhesive sheet 4 has the same shape with the localizing frame 5 in order to bond the light guide plate and LED on the adhesive sheet 4 conveniently. To prevent the LCD unit from any damage, a cushioning part is set between the light guide plate 2 and the LCD unit, the cushioning part can be made with foam plastic or other materials, and the shape of the cushioning parts is fit for the edges of the LCD unit in order that the patterns formed by the LCD unit 6 can be displayed normally. According to the assembly way said above, all parts of the display module 100 are fixed on the localizing frame 5 with strong optical adhesive, and the localizing frame 5 is fixed on the mobile shell by block button hard, so, the service life of the shell and the display module are improved. FIG. 7 shows the assembly process.

Hereinafter, the visual effects of the display module said above are illustrated.

The display module 100 appears mirror effect when the LED 3 is closed; and the display module 100 appears semi-transparent-semi mirror effect when the LED 3 is open, which is resulted from that the light emitted by LED is uniformed by the light guide plate 2. When the light intensity and light color of the LED 3 are changed, the patterns 13 can change accordingly. When necessary, the LED 3 and LCD unit 6 can be open, then the mobile phone appears special semi patterns-semi mirror visual effects, and the patterns and characters appearing in the screen of the LCD unit have flowery optical effects, furthermore, the optical effects can change according to the light intensity and light color. When the LED 3 is closed and the LCD unit 6 is open, the outer surface 121 of shell 1 appears semi-mirror, and the patterns and the characters on the screen of the LCD unit are still clear. Thus, the mobile phone display module prepared according to the present disclosure has preferable visual effects and decorative appearance. By all appearances, when one uses the display module prepared according to the present disclosure to design mobile phone, multiple compound visual effects can be provided according to various display requirements by touching off the luminescence unit, LCD unit, mirror, and the combination of the patterns on the inner surface of the mobile phone shell. Then, it is easier to make the mobile phone with flowery optical effects and minor function, meanwhile, the processes are simplified.

The forming method for the display module 100 according to the present disclosure is illustrated with FIG. 7 hereinafter. FIG. 7 is a forming method schematic diagram of a display module according to an embodiment of the present disclosure. Said forming method comprises the steps as follows: 1) the mobile phone shell 1 is prepared according to the method said above; 2) the localizing frame 5 is prepared; 3) the luminescence unit is prepared; 4) said luminescence unit is localized on the localizing frame 5, and the luminescence unit can transmit light selectively to the shell 1; 5) the shell 1 is connected with the localizing frame 5 by block button or other ways, wherein, the luminescence unit is localized between the inner surface of the shell 1 and the localizing frame 5 in order that the light emitted from the luminescence unit can transmit from the inner surface 122 to the outer surface 121 of the shell 1.

There are two embodiments for illustrating the forming method of the mobile phone display module 100.

Example 1'

The embodiment illustrates a forming method of the mobile phone shell 1 and an assembly method of the display module.

First, a semitransparent-semireflecting layer 11 was formed on the shell 1 by PVD technology to provide mirror or semi-mirror effects. According to the embodiments of the present disclosure, the transmittance of the semitransparent-semireflecting layer 11 was controlled in about 5%-20%, further, the transmittance was controlled in about 5%-15%.

Second, the patterns 13 were printed on the inner surface of the shell 1 by thermal transfer printing.

Third, the localizing frame 5 was formed by punching formed stainless steel, and the LED 3 was adhered in the LED containing part in the localizing frame 5 with adhesive, such as transparent strong optical adhesive and so on.

Fourth, the localizing hole 22 was punched in the light guide plate 2, and adhesive was coated on it, such as transparent strong optical adhesive said above.

Fifth, the localizing pin 52 was formed on the localizing frame 5, and the localizing hole 22 was connected with the localizing pin 52 in order that the light guide plate 2 was connected with the localizing frame 5.

Sixth, the area except the effective display area of the LCD unit was coated adhesive, and the LCD unit was adhered into the corresponding position in the localizing frame 5, then all of the parts of the display module were fixed with the localizing frame 5 with adhesive, the luminescence unit and the localizing frame were assembled.

Seventh, the luminescence unit and the localizing frame were put under the shell 1 according to the designed size, wherein, the shell 1 was treated with physical vapor deposition and thermal transfer printing. The shell 1 was connected with the localizing frame 5 by connecting the block button parts in them, therefore, the shell, LED unit, light guide plate, LCD were assembled to obtain the display module 100, the shell 1 could be connected with the other shells of the mobile phone using the pre-designed block button parts to finish the assembly of a whole mobile phone sample S1.

Example 2'

First, a semitransparent-semireflecting layer 11 was formed on the shell 1 by PVD technology to provide mirror or semi-mirror effects. According to the embodiments of the present disclosure, the transmittance of the semitransparent-semireflecting layer 11 was controlled in about 5%-20%, further, the transmittance was controlled in about 5%-15%.

Second, the patterns 13 were printed on the inner surface of the shell 1 by thermal transfer printing.

Third, the localizing frame 5 was formed by molding polycarbonate, and the LED 3 was adhered in the LED containing part in the localizing frame 5 with adhesive, such as transparent strong optical adhesive and so on.

Fourth, the localizing hole 22 was punched in the light guide plate 2, and adhesive was coated on it, such as transparent strong optical adhesive said above.

Fifth, the localizing pin 52 was formed on the localizing frame 5, and the localizing hole 22 was connected with the localizing pin 52 in order that the light guide plate 2 was connected with the localizing frame 5.

Sixth, the area except the effective display area of the LCD unit was coated adhesive, and the LCD unit was adhered into the corresponding position in the localizing frame 5, then all of the parts of the display module were fixed with the localizing frame 5 with adhesive, the luminescence unit and the localizing frame were assembled.

Seventh, the luminescence unit and the localizing frame were put under the shell 1 according to the designed size, wherein, the shell 1 was treated with physical vapor deposition and thermal transfer printing. The shell 1 was connected with the localizing frame 5 by connecting the block button parts in them, therefore, the shell, LED unit, light guide plate, LCD were assembled to obtain the display module 100, the shell 1 could be connected with the other shells of the mobile phone using the pre-designed block button parts to finish the assembly of a whole mobile phone sample S2.

The performance tests for the shell 1 and the display module 100 prepared according to the embodiments of the present disclosure are illustrated hereinafter. The performance tests for the sample S1 and the sample S2 comprise anti-scratching testing, high-temperature resistance testing, low temperature resistance testing, moisture resistance testing, temperature shock testing, salt spray testing, hundred grids testing, drop ball impact testing and tumbling-drop testing and so on. The detailed processes are said underneath, and the test results are shown in table 1.

Anti-scratching Testing

A pencil (UNI) with hardness of 2H was used to apply about 800 gf on the samples according to an orientation of about 45°, the travel distance was about 10 mm and every sample should be scratched for 3 times, if there was no obvious scratch on the sample, the sample was qualified.

High-temperature Resistance Testing

The samples were put into a precise high-temperature test chamber at about 85° C. for about 240 hours, then the samples were put under room temperature for about 2 hours, if there was no shedding, distortion, flaw or color change on the sample, the sample was qualified.

Low Temperature Resistance Testing

The samples were put into a constant temperature and constant humidity box at about −40° C. for about 240 hours, then the samples were put under room temperature for about 2 hours, if there was no shedding, distortion, flaw or color change on the sample, the sample was qualified.

Moisture Resistance Testing

The samples were put into a constant temperature and constant humidity box at about 60° C. for about 240 hours when the humidity was about 90%, then the samples were put under room temperature fore about 2 hours, if there was no shedding, distortion, flaw or color change on the sample, the sample was qualified.

Temperature Shock Testing

The samples were put into a cold and hot shock machine at about −40° C. for about 1 hour, then the temperature was transformed to about 85° C., the transforming time was about 15 seconds, the samples stayed at about 85° C. for 1 hour. The samples suffered this cycle for 12 times (24 hours), if there was no shedding, distortion, flaw or color change on the sample, the sample was qualified.

Salt Spray Testing

The samples were put into a salt spray chamber at about 30° C. when the humidity was no less than about 85%, then the samples suffered spraying with a solution whose PH value was about 6.8 (NaCl solution with concentration of about 50 g/L) for about 48 hours before taken out; the samples were washed with clear water for about 5 minutes under room temperature, then the sample were dried with blower and put under room temperature for about 1 hour, if there was no shedding, distortion, flaw or color change on the sample, the sample was qualified.

Hundred Grids Testing

The samples were put on a flat and hard table, a cross-open cutting machine is was used to form grids on the surface of the samples, the grids were formed by cutting numbers of linear traces which were crossed with each other according to an angle of 90°, the traces should be deep enough to reveal the substrates of the samples, after the hundred grids area was adhered with adhesive tape for about 5 minutes, the adhesive tape was pulled apart according to an angle of 60° in about 0.5-1 second, then the samples were observed under microscope to confirm if the traces were smooth and if the coatings fell off, the percentage of the grids falling off in total grids was calculated, and the sample was qualified when the percentage was less than 5%.

Drop Ball Impact Testing

According to the GB/T 1732 and ASTMD2794-93 testing standards, the samples were put on the test-bed of the drop ball tester, the mass of the drop ball was about 170 g, the drop height was about 60 cm, after the drop ball impacted the samples for 10 times, the samples were examined if there was shedding, distortion or flaw, if the module peeled off, and if the functions of all parts were still fine.

Tumbling-drop Testing

The samples were put into the sample clip of a tumbling-drop tester and dropped with tumbling, the drop height was about 500 mm, the drop frequency was about 5 times/minute, the drop degree was about 20 times, the samples were examined if there was shedding, distortion or flaw, if the module peeled off or flawed, and if the functions of all parts were still fine.

TABLE 1

|  | Sample No. | |
| --- | --- | --- |
|  | S1 | S2 |
| Anti-scratching testing | no obvious scratch | no obvious scratch |
| Anti-scratching testing | no shedding, distortion, flaw or color change | no shedding, distortion, flaw or color change |
| Low temperature resistance testing | no shedding, distortion, flaw or color change | no shedding, distortion, flaw or color change |
| Moisture resistance testing | no shedding, distortion, flaw or color change | no shedding, distortion, flaw or color change |
| Temperature shock testing | no shedding, distortion, flaw or color change | no shedding, distortion, flaw or color change |
| Salt spray testing | no shedding, distortion, flaw or color change | no shedding, distortion, flaw or color change |

TABLE 1-continued

| | Sample No. | |
| --- | --- | --- |
| | S1 | S2 |
| Hundred grids testing | qualified | |
| Drop ball impact testing | no shedding, distortion, flaw or peeling off, and the functions were still fine | no shedding, distortion, flaw or peeling off, and the functions were still fine |
| Tumbling-drop testing | no shedding, distortion, flaw or peeling off, and the functions were still fine | no shedding, distortion, flaw or peeling off, and the functions were still fine |

As shown in table 1, the semitransparent-semireflecting layer and the ink layer of the mobile phone shell prepared according to the present disclosure were anti-wear and anti-stripping, the display assembly parts of the shell were not easy to distort or flaw, the module were not easy to peel off, and the functions of all parts were still fine after suffering tests, the durability of the shell was improved, and the visual effects of the mobile phone were excellent, so the shell prepared according to the present disclosure has the advantages on appearance and application.

The mobile phone with the shell and the display module prepared according to the present disclosure has stable physical and chemical performance, good durability and excellent visual effects.

In the open embodiments of the present disclosure, a forming method for the shell and display module of mobile communication terminals was disclosed, said forming method comprises performing physical vapor deposition and thermal transfer printing on transparent or semitransparent shell body, and cooperating the shell body with the luminescence unit or LCD unit to realize the effects observed from the outside of the mobile communication terminal shell as follows:

1) When the luminescence unit is closed, the shell appears mirror;

2) When the luminescence unit is open, the shell appears semitransparent-semi mirror;

3) When the light intensity and the light color of the luminescence unit changes, the printed patterns can change according to different light intensity and light color;

4) When the luminescence unit and the LCD unit are open at the same time, the shell body appears semitransparent-semi mirror, and the patterns displayed on the screen of the LCD unit can be observed through the shell body; and 5) When the luminescence unit is closed and the LCD unit is open, the shell appears semi-mirror, and the patterns and characters on the screen of LCD unit are still clear.

Thus, said shell and display module improve the visual effects of the mobile communication terminal greatly.

As common technicians in this field, one can vary, amend, displace or form a according to the principle and the spirit of the present disclosure, the scope of the present disclosure is determined by the claims and the equivalents thereof.

What is claimed is:

1. A shell of mobile communication terminal, comprising:
a shell body made by a transparent or semitransparent material and having an outer surface and an inner surface, the inner surface having patterns formed thereon; and
a semitransparent-semireflecting layer formed on the outer surface of the shell body, wherein the patterns can be observed from outside of the shell body when there is light transmitting from the inner surface to the outer surface, and the semitransparent-semireflecting layer presents a mirror effect when there is no light transmitting from the inner surface to the outer surface, wherein the semitransparent-semireflecting layer has a transmittance of about 5%-25%.

2. A shell of mobile communication terminal according to claim 1, wherein, said transparent or semitransparent material includes at least one material selected from the group consisting of polycarbonate, acrylonitrile-butadiene-styrene copolymer and polycarbonate alloy.

3. A shell of mobile communication terminal according to claim 2, wherein, the transparent or semitransparent material includes polycarbonate whose average molecular weight is about 20,000-50,000.

4. A shell of mobile communication terminal according to claim 1, wherein, said patterns are printed on the inner surface by thermal transfer printing.

5. A display module of a mobile communication terminal, comprising:
a shell according to one of claim 1;
a localizing frame for connecting with the shell; and
a luminescence unit located between the inner surface of the shell and the localizing frame.

6. A display module according to claim 5, wherein, the luminescence unit comprises at least one LED and a light guide plate adjacent to the LED for guiding light emitted from the LED to the shell, wherein the light guide plate is transparent in unidirection, and wherein the luminescence unit can emit light with different intensity and different colors.

7. A display module according to claim 6, further comprising a LED unit, wherein, a central hole is provided in the center of the localizing frame, the LED unit is contained in the central hole and connected with the light guide plate, and the light guide plate guides light emitted from the LED unit to the shell.

8. A display module according to claim 7, wherein, the light guide plate is adhered to the localizing frame, and the LED unit is adhered to the light guide plate.

9. A display module according to claim 8, wherein, one of the light guide plate and the localizing frame has a localizing pin, and the other has a localizing hole matching the localizing pin in order to localize the light guide plate precisely.

10. A shell of mobile communication terminal, comprising:
a shell body made by a transparent or semitransparent material and having an outer surface and an inner surface, the inner surface having patterns formed thereon; and
a semitransparent-semireflecting layer formed on the outer surface of the shell body, wherein the patterns can be observed from outside of the shell body when there is light transmitting from the inner surface to the outer surface, and the semitransparent-semireflecting layer presents a mirror effect when there is no light transmitting from the inner surface to the outer surface,
wherein, the semitransparent-semireflecting layer comprises:
a primer layer coated on the outer surface;
an electroplated layer formed on the primer layer by electroplating a predetermined amount of a target material;
a colored paint layer with a predetermined thickness coated on the electroplated layer; and
a topcoat layer with a predetermined thickness coated on the colored paint layer.

11. A method for forming a shell of mobile communication terminal comprising:

forming a shell body having an outer surface and an inner surface with a transparent or semitransparent material;

forming patterns on the inner surface of the shell body;

forming a semitransparent-semireflecting layer on the outer surface of the shell body, wherein, said patterns can be observed from outside of the shell body when there is light transmitting from the inner surface to the outer surface, and the semitransparent-semireflecting layer presents a mirror effect when there is no light transmitting from the inner surface to the outer surface, wherein the semitransparent-semireflecting layer has a transmittance of about 5%-25%.

12. A method according to claim 11, wherein, the semitransparent-semireflecting layer is formed on the outer surface by physical vapor deposition or electroplating.

13. A method according to claim 11, wherein, forming patterns on the inner surface comprises:

forming predetermined patterns on a surface of a film; and hot-pressing the patterns on the surface of the film to the inner surface by thermal transfer printing.

14. A method of forming a display module of mobile communication terminal, comprising:

forming a shell;

forming a localizing frame;

forming a luminescence unit;

fixing the luminescence unit on the localizing frame; and connecting the shell with the localizing frame, wherein, the luminescence unit is set between the inner surface of the shell and the localizing frame in order that the light emitted from the luminescence unit can pass the shell from the inner surface to the outer surface, wherein the shell includes a semitransparent-semireflectind layer with a transmittance of about 5%-25%.

15. A method according to claim 14, wherein, the localizing frame is formed by punching or molding.

16. A method according to claim 14, wherein, the step for forming the luminescence unit comprises setting at least one LED and a light guide plate adjacent each other in order that the light guide plate can guide the light emitted from the LED to the shell.

17. A method according to claim 14, further comprising:

forming a central hole in a center of the localizing frame;

providing a LED unit;

connecting the LED unit with a light guide plate through the central hole in order that the light guide plate can guide light emitted from the LED unit to the shell.

18. A method according to claim 17, wherein, the luminescence unit is adhered to the localizing frame, and the LED unit is adhered to the light guide plate through the central hole.

19. A method according to claim 18, wherein, one of the light guide plate and the localizing frame has localizing pin, and the other has localizing hole matching the localizing pin in order to localize the light guide plate precisely.

* * * * *